United States Patent
Lee et al.

(10) Patent No.: US 8,777,203 B2
(45) Date of Patent: Jul. 15, 2014

(54) ROTATION JIG DEVICE OF PROCESSING MACHINE

(71) Applicant: Sungwoo Hitech Co., Ltd., Busan (KR)

(72) Inventors: Mun Yong Lee, Busan (KR); Sang-Eon Park, Busan (KR); Jong Tae Seo, Ulsan (KR)

(73) Assignee: Sungwoo Hitech Co., Ltd., Busan (KR)

( * ) Notice: Subject to any disclaimer, the term of this patent is extended or adjusted under 35 U.S.C. 154(b) by 0 days.

(21) Appl. No.: 13/726,307

(22) Filed: Dec. 24, 2012

(65) Prior Publication Data

US 2014/0165752 A1 Jun. 19, 2014

(30) Foreign Application Priority Data

Dec. 17, 2012 (KR) .................. 10-2012-0147744

(51) Int. Cl.
 *B23Q 3/00* (2006.01)
(52) U.S. Cl.
 USPC ............................... 269/60; 269/55
(58) Field of Classification Search
 USPC .............. 269/60, 55, 61, 58, 71, 126
 See application file for complete search history.

(56) References Cited

U.S. PATENT DOCUMENTS

| | | | | |
|---|---|---|---|---|
| 5,203,062 | A | * | 4/1993 | Nishio ............................ 29/237 |
| 5,497,060 | A | * | 3/1996 | Juergens, III ................... 700/60 |
| 7,811,034 | B1 | * | 10/2010 | Karow ........................... 409/179 |
| 2007/0199187 | A1 | * | 8/2007 | Ohmori et al. ............... 29/27 C |

FOREIGN PATENT DOCUMENTS

| | | |
|---|---|---|
| JP | 03-228533 | 10/1991 |
| JP | 07-077228 | 3/1995 |
| JP | 11-262834 | 9/1999 |
| KR | 1997-0020299 | 5/1997 |

* cited by examiner

*Primary Examiner* — Lee D Wilson
(74) *Attorney, Agent, or Firm* — Lexyoume IP Meister, PLLC

(57) ABSTRACT

A rotation jig device may include both side housings that are disposed at both sides, a reverse gear that is disposed inside both side housings, a groove portion, front and rear side connection gears that are engaged with the reverse gear in both side housings, front and rear side pinion gears that are disposed at the front/rear side connection gear to be rotated, a rack gear that penetrates both side housings to be engaged with the front and rear side pinion gears, an advanced/retreat cylinder that is connected to each rack gear of both side housings to move each rack gear backward or forward, and a clamping portion that is disposed at the reverse gear and rotates with the reverse gear to clamp the workpiece.

7 Claims, 4 Drawing Sheets

ROTATION JIG DEVICE OF PROCESSING MACHINE

CROSS-REFERENCE TO RELATED APPLICATION

This application claims priority to and the benefit of Korean Patent Application No. 10-2012-0147744 filed in the Korean Intellectual Property Office on Dec. 17, 2012, the entire contents of which are incorporated herein by reference.

BACKGROUND OF THE INVENTION (a) Field of the Invention

The present invention relates to a rotation jig device for manufacturing. More particularly, the present invention relates to a rotation jig device for manufacturing that is configured on a table of a processing device to rotate a workpiece in accordance with a direction of a cutting process.

(b) Description of the Related Art

Generally, a product that is made by casting or extruding is finished by a cutting process to be a highly precise end product in an industrial field.

The cutting process is divided into a turning process, a drilling process, a boring process, a milling process, a grinding process, and so on.

Particularly, the manufacturing processes such as the drilling process that uses a drill to form a hole, the boring process that is used to widen the hole, and the milling process that transfers a workpiece on a rotating tool to cut it are types using rotating manufacturing tools.

That is, a manufacturing tool that is rotated by a spindle moves along a predetermined route on the workpiece through a program that is input into an operation box in advance so as to cut the workpiece to a desired shape in the drilling, the boring, and the milling processes.

A jig device is configured on the manufacturing device such as the drilling process, the boring process, and the milling process to fix the workpiece on the table.

The jig device of the manufacturing device securely fixes the workpiece on the table while a manufacturing tool is moved into a processing part and cuts the part.

However, when the cutting parts of the workpiece are at both sides of the workpiece, the workpiece is separated from the jig device, the direction thereof is transformed, and the workpiece is fixed on the jig device again so as to make the untreated part thereof face the manufacturing tool, and therefore there is a drawback that the direction of the workpiece needs to be manually transformed.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a rotation jig device for manufacturing having advantages of rotating a workpiece in accordance with a direction of a cutting tool on a table of a manufacturing device.

A rotation jig device for manufacturing according to an exemplary embodiment of the present invention may include: both side housings that are respectively disposed at both sides of a front side on a table at a predetermined distance from each other; a reverse gear that is rotatably disposed at an upper side of a middle side inside both side housings, a groove portion of which a predetermined part is incised is formed thereon, and a holder is disposed in the groove portion; front and rear side connection gears that are respectively engaged with both sides of a lower side of a front/rear direction of the reverse gear in both side housings to transfer torque to the reverse gear; front and rear side pinion gears that are respectively disposed at an inner side surface of the front/rear side connection gear to be rotated together through each connection shaft, a rack gear that penetrates both side housings to be engaged with the front and rear side pinion gears; an advanced/retreat cylinder that is disposed at a rear side of the table to be connected to a rear end portion of each rack gear of both side housings to move each rack gear backward or forward; and a clamping portion that is disposed at one side of an inner side surface of the reverse gear and rotates with the reverse gear to clamp the workpiece to the holder.

The reverse gear may be externally engaged with the front/rear side connection gear in the housing.

The holder may be made of non-metal material.

The connection shaft may include a front side connection shaft that connects a front side connection gear of both sides with a front side pinion gear at a front side between the both side housings, and a rear side connection shaft that connects a rear side connection gear of both sides with a rear side pinion gear at a rear side between both side housings.

Front and rear side guide rollers may be disposed at an inner portion of both side housings to slidably support a lower side of the rack gear correspondingly to each lower portion of the front and rear side pinion gears.

The advance/reverse cylinder may be disposed at a rear side middle portion on the table in through a cylinder bracket a front/rear direction and is connected to an operating rod through a push bracket and a supporter at a rear end portion of each rack gear of both side housings.

The clamping portion may include a hinge bracket that is engaged with one side of an inner side surface of the reverse gear and forms a first hinge portion and a second hinge portion respectively on one side portion and an upper portion, a clamping cylinder that is connected to the first hinge portion through a hinge and forms a third hinge portion on a front end of an operating rod, a link that is connected to the second hinge portion through a hinge and one end thereof is connected to a front end of the operating rod through the third hinge portion, a clamping rod that is engaged with the other end portion of the link, and a clamper that is disposed at a front end of the clamping rod to clamp the workpiece to the holder.

An exemplary embodiment of the present invention automatically rotates the workpiece in accordance with the direction of a cutting process to improve efficiency of production.

That is, a reverse gear is rotated in a counterclockwise direction or a clockwise direction in accordance with the operation of the advance/reverse gear and a cutting area of the workpiece is made to face a manufacturing tool to improve production efficiency, particularly, a cutting direction is easily transformed by rotating the reverse gear without re-setting the workpiece in the jig device, and therefore the cutting process is continuously performed to improve productivity.

Also, the advance/reverse length of the advance/reverse cylinder is controlled to be able to rotate the reverse gear in a clockwise direction or counterclockwise direction within a maximum of 180° such that a cutting area of 360° is secured, and therefore the entire surface of the workpiece can be easily cut.

DESCRIPTION OF SYMBOLS

<Description of Symbols>

Figure 1:
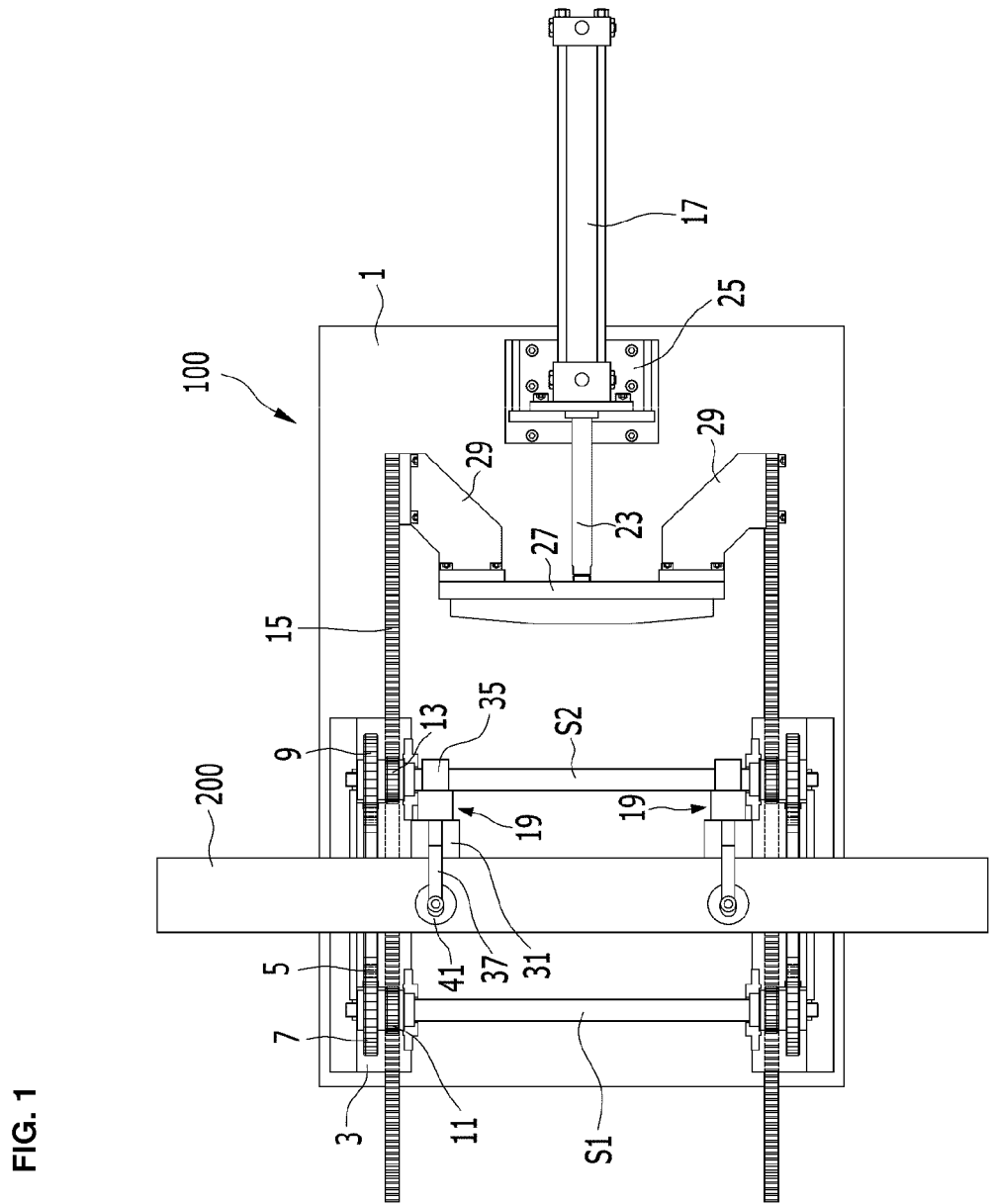
FIG. 1 is a top plan view of a rotation jig device for manufacturing according to an exemplary embodiment of the present invention.

| | | | |
|---|---|---|---|
| 1: | table | 3: | housing |
| 5: | reverse gear | 7, 9: | connection gear |
| 11, 13: | pinion gear | 15: | rack gear |
| 17: | advance/retreat cylinder | 19: | clamping portion |
| 21: | holder | 25: | cylinder bracket |
| 27: | push bracket | 29: | supporter |
| 31: | hinge bracket | 23: | operating rod |
| 35: | clamping cylinder | 37: | link |
| 39: | clamping rod | 41: | clamper |
| 100: | rotation jig device | 200: | workpiece |
| 300: | manufacturing tool | S1, S2: | connection shaft |
| R1, R2: | guide roller | | |

DETAILED DESCRIPTION OF THE EMBODIMENTS

Hereinafter, an exemplary embodiment of the present invention will be described in detail with reference to the accompanying drawings.

However, a size and a thickness of each element illustrated in the drawing are arbitrarily represented for the convenience of description, so that the present invention is not essentially limited to the drawings, and a thickness is expanded in order to clearly express several parts and regions.

Also, like reference numerals designate like elements throughout the specification, and the terms "first", "second", etc. in the following description is for discriminating the configurations because the names are the same and the present invention is not limited to the order.

Also, it is described that a left direction, a front direction, and a right direction of FIG. 1 are defined to a rear direction for convenience of explanation in an exemplary embodiment of the present invention.

Figure 2:
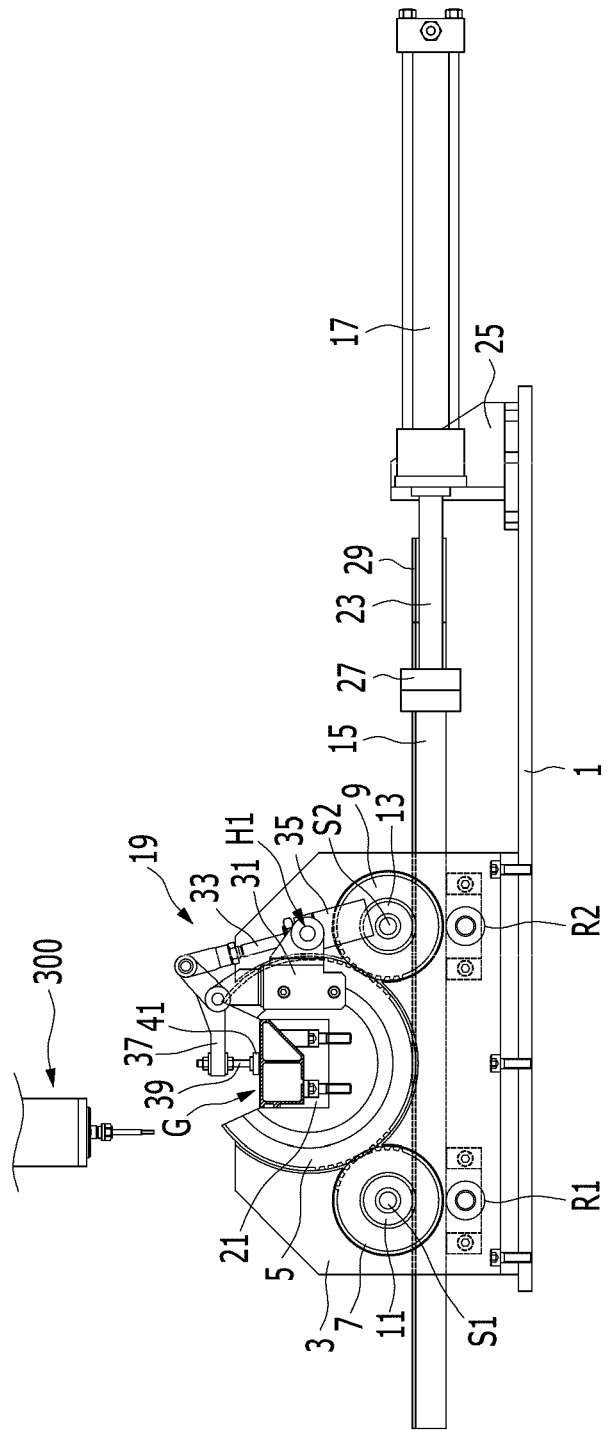
FIG. 2 is a side view of a rotation jig device for manufacturing according to an exemplary embodiment of the present invention.
Figure 3:
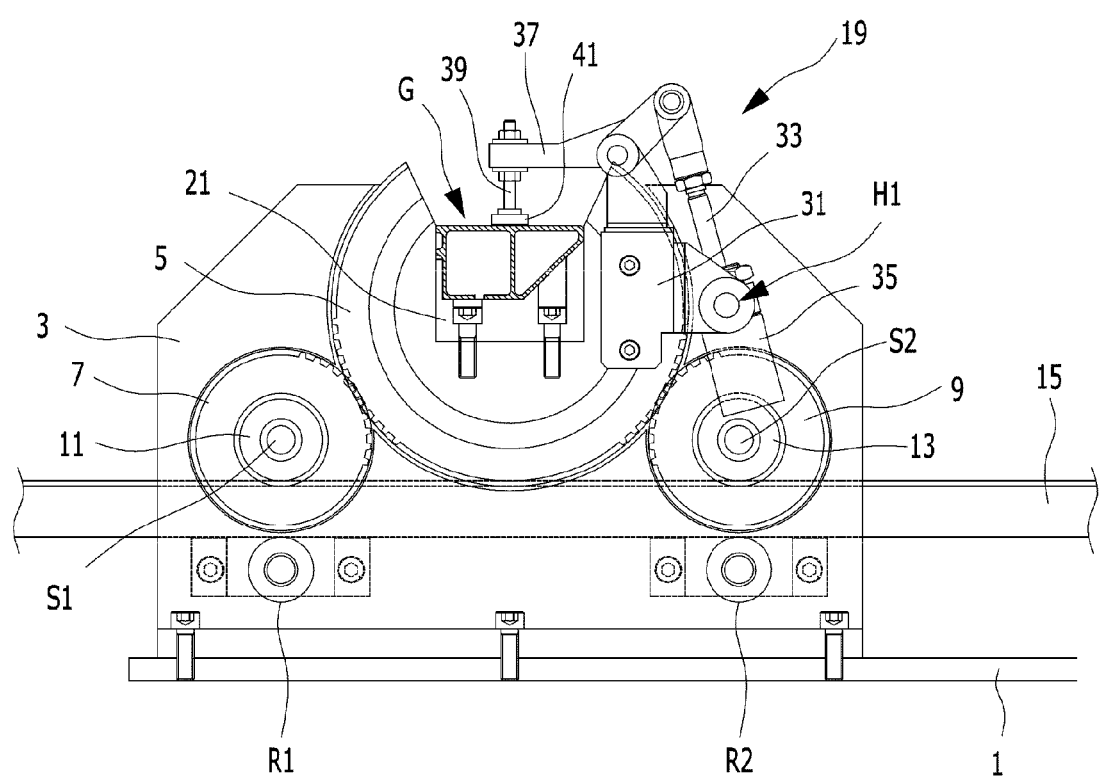
FIG. 3 is a partial detail side view of a rotation jig device for manufacturing according to an exemplary embodiment of the present invention.

FIG. 1 is a top plan view of a rotation jig device for manufacturing according to an exemplary embodiment of the present invention, FIG. 2 is a side view of a rotation jig device for manufacturing according to an exemplary embodiment of the present invention, and FIG. 3 is a partial detail side view of a rotation jig device for manufacturing according to an exemplary embodiment of the present invention.

Referring to FIG. 1 to FIG. 3, a rotation jig device 100 for manufacturing according to an exemplary embodiment of the present invention includes a both-side housings 3 that are respectively disposed at both sides on a table 1 of a processing device, a reverse gear 5, front and rear side connection gears 7 and 9, front and rear side pinion gears 11 and 13, a rack gear 15, an advance/retreat cylinder 17, and a clamping portion 19.

A table 1 is prepared, and a workpiece 200 is fixed on the table 1 such that the workpiece 200 is processed by a manufacturing tool 300.

The rotation jig device 100 is used to fix the workpiece 200 on the table 1 according to an exemplary embodiment of the present invention, and the rotation jig device 100 rotates the workpiece 200 in accordance with a cutting direction such that the manufacturing tool 300 easily cuts a part of the workpiece 200 in a case that both sides of the workpiece 200 are to be cut.

As descried above, in a rotation jig device 100 according to an exemplary embodiment of the present invention, housings 3 are fixed at both sides of a front side on the table 1 at a predetermined distance from each other.

The reverse gear 5 is disposed at an upper side of a middle portion in each housing 3, and a predetermined section of the reverse gear 5 is incised to form a groove portion (G).

Also, a holder 21 is inserted into the groove portion (G) to fix the workpiece 200.

Here, the holder 21 can be made up of a non-metal material, and particularly, it can be made up of a resin composite material or a plastic material to have a predetermined hardness.

Also, the front and rear side connection gears 7 and 9 are respectively engaged with both sides of a lower portion of a front/rear side of the reverse gear 5 to transfer torque to the reverse gear 5.

That is, the front and rear side connection gears 7 and 9 are respectively externally engaged with the reverse gear 5 at a lower side of an inner portion of the housing 3.

The front and rear side pinion gears 11 and 13 are respectively disposed to correspond to each inner side surface of the front and rear side connection gears 7 and 9 and are integrally formed with the front and rear side connection gears 7 and 9 through each of connection shafts S1 and S2.

Here, the connection shafts S1 and S2 include a front side connection shaft S1 that connects the front side connection gear 7 with the front side pinion gear 11 at a front side between both side housings 3 and a rear side connection shaft S2 that connects the rear side connection gear 9 with the rear side pinion gear 13 at a rear side between both side housings 3.

Also, the rack gear 15 penetrates both side housings 3 in a front/rear direction to be engaged with each lower side of the front and rear side pinion gears 11 and 13.

Front and rear side guide rollers R1 and R2 corresponding to each lower portion of the front and rear side pinion gears 11 and 13 are respectively disposed in both side housings 3 to support a lower side of the rack gear 15.

That is, the front and rear side guide rollers R1 and R2 rotatably support a lower surface of the rack gear 15 at both sides to guide the front/rear direction movement.

Also, the advance/retreat cylinder 17 is disposed at a rear side of the table 1 and is connected to a rear end portion of each rack gear 15 of both side housings 3 through an operating rod 23 to push or pull each rack gear 15.

That is, the advance/reverse cylinder 17 is disposed at a middle portion between both side housings 3 through a cylinder bracket 25 at a rear side of the table 1 and the operating rod 23 is connected to a rear end portion of the rack gear 15 of both side housings 3 through a push bracket 27 and side supporters 29.

Also, the clamping portion 19 is disposed at one side of the reverse gear 5 to rotate together with the reverse gear 5 and clamps the workpiece 200 that is loaded by the holder 21.

That is, the clamping portion 19 includes a hinge bracket 31, a clamping cylinder 35, a link 37, a clamping rod 39, and a clamper 41.

The hinge bracket 31 is engaged with one side of the reverse gear 5, and a first hinge portion H1 and a second hinge portion H2 are formed at one side and an upper portion of the hinge bracket 31.

One side of the clamping cylinder 35 is connected to the first hinge portion H1, and a third hinge portion H3 is formed at a front end of the operating rod 33.

One side of the link 37 is connected to the second hinge portion H2, and one end thereof is connected to a front end of the operating rod 33 of the clamping cylinder 35 through the third hinge portion H3.

Also, the clamping rod 39 is engaged with the other end portion of the link 37 through a screw structure and the clamper 41 is mounted of a front end of the clamping rod 39.

Accordingly, the link rotates based on the second hinge portion H2 in accordance with the advance movement of the clamping cylinder 35, and the clamper 41 of the clamping portion 19 presses an upper surface of the workpiece 200 to clamp the holder 21.

The clamping portion 19 clamps the workpiece 200 on the holder 21 to be rotated together with the reverse gear 5.

Accordingly, in a rotation jig device for manufacturing 100 as described above, as shown in FIGS. 1 and 2, the workpiece 200 is placed in the holder 21 and the clamping cylinder 35 is operated to make the clamper 41 clamp an upper surface of the workpiece 200.

As described, in a condition that a manufacturing tool 300 has entered into a cutting area and the workpiece 200 is being cut, the rotation jig device 100 securely fixes the workpiece 200 on the table 1.

In this case, when a cut area is disposed at both sides of the workpiece 200, the surface that is not cut is made to face the manufacturing tool 300.

Figure 4:
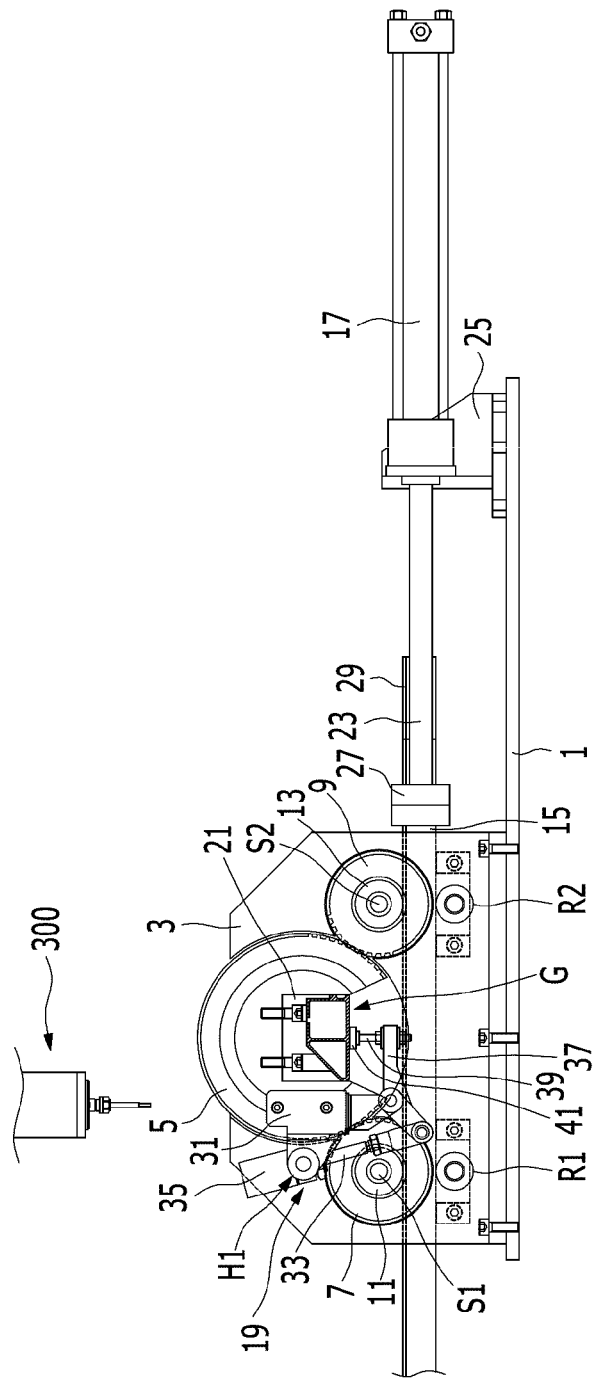
FIG. 4 shows a reverse operating state of a rotation jig device for manufacturing according to an exemplary embodiment of the present invention.

That is, referring to FIG. 4, if the advance/retreat cylinder 17 is operated, both side rack gears 15 move forward or backward to rotate the front and rear side pinion gears 11 and 13 in a clockwise direction or a counterclockwise direction.

Accordingly, the front/rear connection gears 7 and 9 rotate together with the front and rear pinion gears 11 and 13 in the same direction to make the reverse gear 5 that is externally meshed rotate in a counterclockwise direction or a clockwise direction such that the processing area of the workpiece 200 is exposed toward the manufacturing tool 300.

Thereby, the rotation jig device 100 according to an exemplary embodiment of the present invention transforms a cutting direction through the rotation of the reverse gear 5 to make the cutting process easy without detachment of the workpiece 20.

Meanwhile, the rotation jig device 100 according to an exemplary embodiment of the present invention controls the advance/retreat length of the advance/retreat cylinder 17 to be able to rotate the reverse gear 5 in a clockwise direction or counterclockwise direction within a maximum of 180° such that a cutting area of 360° is secured, and therefore the entire surface of the workpiece 200 can be easily cut.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rotation jig device for manufacturing, comprising:
   housings that are respectively disposed at both sides of a front side on a table at a predetermined distance from each other;
   a reverse gear that is rotatably disposed at an upper side of a middle side inside both side housings, a groove portion of which a predetermined part is incised is formed thereon, and a holder is disposed in the groove portion;
   front and rear side connection gears that are respectively engaged with both sides of a lower side of a front/rear direction of the reverse gear in both side housings to transfer torque to the reverse gear;
   front and rear side pinion gears that are respectively disposed at an inner side surface of the front and rear side connection gears to be rotated together through each connection shaft;
   a rack gear that penetrates both side housings to be engaged with the front and rear side pinion gears;
   an advanced/retreat cylinder that is disposed at a rear side of the table to be connected to a rear end portion of each rack gear of both side housings to move each rack gear backward or forward; and
   a clamping portion that is disposed at one side of an inner side surface of the reverse gear and rotates with the reverse gear to clamp the workpiece to the holder.

2. The rotation jig device for manufacturing of claim 1, wherein the reverse gear is externally engaged with the front and rear side connection gears in the housing.

3. The rotation jig device for manufacturing of claim 1, wherein the holder is made of a non-metal material.

4. The rotation jig device for manufacturing of claim 1, wherein the connection shaft includes:
   a front side connection shaft that connects a front side connection gear of both sides with a front side pinion gear at a front side between both side housings; and
   a rear side connection shaft that connects a rear side connection gear of both sides with a rear side pinion gear at a rear side between both side housings.

5. The rotation jig device for manufacturing of claim 1, wherein front and rear side guide rollers are disposed at an inner portion of both side housings to slidably support a lower side of the rack gear correspondingly to each lower portion of the front and rear side pinion gears.

6. The rotation jig device for manufacturing of claim 1, wherein the advance/retreat cylinder is disposed at a rear side middle portion on the table through a cylinder bracket in a front/rear direction and is connected to an operating rod through a push bracket and a supporter at a rear end portion of each rack gear of both side housings.

7. The rotation jig device for manufacturing of claim 1, wherein the clamping portion includes:
   a hinge bracket that is engaged with one side of an inner side surface of the reverse gear and forms a first hinge portion and a second hinge portion respectively on one side portion and an upper portion;
   a clamping cylinder that is connected to the first hinge portion through a hinge and forms a third hinge portion on a front end of an operating rod;
   a link that is connected to the second hinge portion through a hinge and one end thereof is connected to a front end of the operating rod through the third hinge portion;
   a clamping rod that is engaged with the other end portion of the link; and
   a clamper that is disposed at a front end of the clamping rod to clamp the workpiece to the holder.

\* \* \* \* \*